Aug. 26, 1958     D. A. BLACK     2,848,911

WORK PROTECTOR FOR DRILL CHUCKS

Filed Feb. 14, 1956

INVENTOR.
DANIEL A. BLACK.
BY
Christy, Parmelee & Strickland
ATTORNEYS.

United States Patent Office 2,848,911
Patented Aug. 26, 1958

2,848,911
WORK PROTECTOR FOR DRILL CHUCKS

Daniel A. Black, Pittsburgh, Pa., assignor to Fabricated Products Company, Inc., West Newton, Pa., a corporation of Pennsylvania Application February 14, 1956, Serial No. 565,356

1 Claim. (Cl. 77—55)

The present invention pertains in general to power drilling tools and more specifically to an attachment for mounting upon the drill bit of a portable hand drilling tool for the prevention of damage to the surface of a work piece through engagement thereof with the end of the drill chuck after the drill bit has penetrated the work piece.

Portable power tools and particularly hand power tools have found a great variety of uses in the factory, on the farm and about the home. A hand power tool such as an electric drill in the hands of a skilled workman may be used effectively to drill holes in a great variety of materials. In many cases however, particularly where the drill bit is long enough to penetrate the piece being worked upon, the tool becomes an engine of distruction by reason of the end of the chuck of the drill rotating in engagement with the work piece damaging the surface thereof. In the erection of farm and factory buildings it is customary to erect a steel structure and thereafter attach corrugated sheets of suitable material to the walls and roof of the building. In such cases the abutting end of the corrugated sheeting are overlapped and holes drilled through the overlapped sheeting and the steel structural member beneath it. Usually the total thickness of metal is considerably less than the length of the drill bit in the chuck of the drill. In the hands of an inexperienced or careless workman continued pressure on the electric drill after the drill bit has penetrated the structural member causes the end of the drill chuck to engage the outer adjacent face of the corrugated sheet being drilled thereby tearing the outer face of the sheet where it is of metal and sometimes badly cracking the sheet where it is of composition material. In the case of galvanized sheets the galvanizing is stripped from the sheet in the areas surrounding the hole drilled therethrough so that when a fastening member is mounted in the drilled opening the unprotected metal portions are subject to rapid deterioration through rusting and in the case of composition material the cracks are frequently large enough to cause leaks.

The operation of permitting the drill bit to pentrate the work to such an extent that the end of the drill chuck engages the work piece is referred to in the trade as "riding the drill." In addition to damaging the face of the work piece an additional undesirable condition results from permitting the end of the drill chuck to engage the work piece, that is engagement between the end of the chuck and the work piece has a tendency to deflect the drill laterally of the hole. When this occurs the hole is frequently elongated causing additional adjacent areas of the face of the work piece to be damaged and increasing the danger of leakage about the shank of the fastening member. Such deflection often results in a broken drill bit.

One object of the invention is to provide a device which may be slipped over the end of the drill bit to adjacent the face of the drill chuck preventing engagement between the end of the drill chuck and the work piece when a workman "rides" the drill as aforesaid.

Another object of the invention is to provide a device for the purpose described comprising a metal backing member having a compressible rubber facing on one side thereof for engagement with the work piece.

A further object of the invention is to provide a device for the purpose described having a wear resistant backing member provided with an opening larger than the drill bit for reception thereof and a compressible work piece engaging rubber facing on said backing member having an opening therein slightly smaller than the drill bit.

These and other objects of the invention will be made apparent from the following description and the drawings forming a part thereof wherein.

Figure 2:
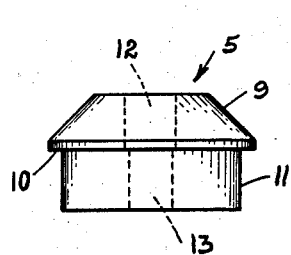
Fig. 2 shows in elevation an enlarged view of the protective device.
Figure 3:
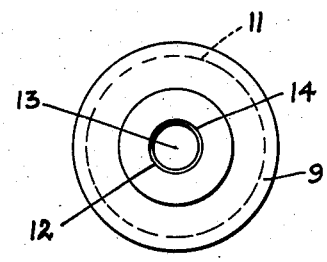
Fig. 3 is a plan view of the protective device showing the relation between the diameters of the openings in the backing member and rubber face.

Referring now in detail to the drawing, reference character 1 refers to the drill generally having at one end thereof the usual expansible chuck 2 for reception and retention of the drill bit 3. The drill is also provided with the usual knurled member 4 for opening and closing the chuck 2 to receive the drill bit 3 and lock it securely in place. Reference character 5 indicates the protective member mounted on the drill bit and reference character 6 indicates corrugated roofing sheets having their adjacent overlapped edges 7 and 8 penetrated by the drill bit 3. In Figs. 2 and 3 the protective device 5 is shown as comprising a wear resistant backing member 9 which may be of cone shape as shown or flat. This member may be, and preferably is, of metal but may be of any other suitable wear resistant material. Bonded to the face 10 of the backing member 9 is a rubber facing member 11. The opening 12 in the backing member 9 is larger in diameter than the diameter of the drill bit 3 to be inserted therein. The opening 13 in the rubber facing 11 is preferably of slightly smaller diameter than that of the drill bit 3 to be engaged thereby. The openings 12 and 13 are preferably concentric and as shown in Fig. 3 provide a portion 14 of the member 11 which is not bonded to the backing member 9. As a consequence of this construction when the drill bit 3 is inserted through the opening 12 of the protective member 5, it displaces the unbonded portion 14 of the member 11 and thus freely passes through the opening 13 in the member 11. The rubber member 11 provides resilient engagement with the drill bit to resist disengagement therefrom while permitting the protector 5 to be moved axially of the bit from the end thereof to adjacent the face of the chuck.

The material used to form the backing member 9 and the facing member 11 may be largely a matter of choice. The backing member 9 should be at least semi-rigid and somewhat abrasive resistant and have sufficient body so as to not break or crumble as the end of the chuck 2 rotates relative thereto and in engagement therewith. The facing member 11 may be of any suitable resilient material so as to not mar the face of the work piece when engaging therewith while rotating with the drill bit. The material of which member 11 is formed should also provide sufficient frictional engagement with the work piece to normally arrest rotation of the protective member 5. The attachment of the member 11 to the backing member 9 at the face 10 of the latter may be in any suitable manner. In the case of rubber it is preferable to bond or cement the members 9 and 11 together and that the holding power of the bonding or cementing material be sufficient to prevent separation of the members.

Figure 1:
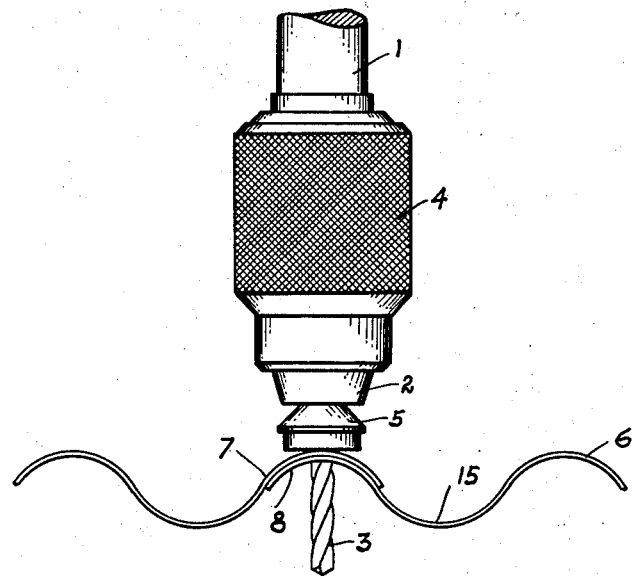
Fig. 1 shows the chuck end of a power drill having a drill bit mounted in the chuck and the protective device mounted on the drill bit with the metal backing member of the device disposed adjacent the face of the end of the drill chuck.

In use as shown in Fig. 1, when the drill bit 3 penetrates the overlapped portions of the corrugated sheathing 6, and the operator "rides the drill," the rubber facing member 11 engages the adjacent surface of the corrugated sheet to protect same and also provides non-abrasive frictional engagement therewith normally sufficient to prevent further rotation of the device 5. The drill bit 3 and chuck 2 may continue in rotation with the face of the chuck in engagement with the backing member 9. By reason of the cushioning effect of member 11 and free rotation of the drill chuck in engagement with the upper face of device 5, there is no tendency to deflect the drill bit 3 causing breakage thereof or enlargement of the hole being drilled. In such cases where the workman carelessly continues to "ride the drill" after engagement between the adjacent faces of the drill chuck and member 9, sufficient frictional resistance may be created to cause rotation of members 9 and 11. This condition may cause accelerated destruction of member 11 but will not cause harm to the adjacent face of the sheets 6 due to the resiliency of member 11. To this extent the device 5 is expendable and may be readily replaced.

Frequently the holes for the fasteners are placed in the valleys of the corrugations as at 15. In such cases the rubber member 11 is readily deflected to correspond to the contour of the corrugation valley providing a full bearing for the member 11 and prevent abrasion of the sides of the valley of the corrugation which would occur due to a more or less line contact as where the member 11 is of substantially rigid material or not readily deflectable. The member 9 plays an important part in such cases, since being of relatively thin material it can deflect to conform to the shape of the said valley, spread the bearing pressure on member 11 and is spaced from the sheet by the deflected portions of member 11.

The work protector as described not only protects the work but also reduces drill breakage by substantially preventing deflection of the drill upon engagement between the drill chuck and backing member. Although the device has been shown in use with corrugated sheets, it obviously is usable in protecting flat surfaced work pieces or work pieces of contours other than corrugated.

I claim:

A work protective attachment for hand drill chucks used in drilling holes through a metal member, comprising a wear resistant plate like member having an upper face adapted to provide bearing engagement for the end of a drill chuck, an opening through said plate like member larger than a drill bit to be received in said chuck providing free passage of a drill bit extending from said chuck, a resilient rubber facing bonded to the lower face of the plate like member and of substantially greater thickness than the plate like member, said rubber facing adapted to space the plate like member from the surface of a member being drilled, and an opening extending through said rubber facing concentric with the plate like member opening, said rubber facing opening being sufficiently smaller than the diameter of the drill bit extending therethrough to retain the attachment upon the drill by compression of the rubber and providing less frictional resistance to rotation of the drill bit than the frictional resistance of the under face of the rubber facing to rotation upon engaging the adjacent face of the surface of the member being drilled.

References Cited in the file of this patent

UNITED STATES PATENTS

| | | |
|---|---|---|
| 2,353,514 | Slater | July 11, 1944 |
| 2,700,905 | Urquhart | Feb. 1, 1955 |
| 2,726,006 | Brewer et al. | Dec. 6, 1955 |
| 2,788,684 | Scharf | Apr. 16, 1957 |